(12) United States Patent
Wang et al.

(10) Patent No.: US 8,774,499 B2
(45) Date of Patent: Jul. 8, 2014

(54) EMBEDDED OPTICAL FLOW FEATURES

(75) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 305 days.

(21) Appl. No.: 13/405,986

(22) Filed: Feb. 27, 2012

(65) Prior Publication Data

US 2012/0219213 A1 Aug. 30, 2012

Related U.S. Application Data

(60) Provisional application No. 61/447,502, filed on Feb. 28, 2011.

(51) Int. Cl.
*G06K 9/00* (2006.01)

(52) U.S. Cl.
USPC .......................................... 382/159

(58) Field of Classification Search
None
See application file for complete search history.

(56) References Cited

U.S. PATENT DOCUMENTS

| | | | |
|---|---|---|---|
| 6,993,462 B1 | 1/2006 | Pavlovic et al. | |
| 6,999,601 B2 | 2/2006 | Pavlovic et al. | |
| 8,396,286 B1 * | 3/2013 | Aradhye et al. | 382/159 |
| 2011/0116711 A1 | 5/2011 | Wang et al. | |

OTHER PUBLICATIONS

Mikolajczyk, K., et al., "Scale & Affine Invariant Interest Point Detectors", International Journal of Computer Vision 60(1), 63-86, 2004.
Natarajan, P., et al., "Graphical Framework for Action Recognition using Temporally Dense STIPs", Motion and Video Computing 2009, WMVC '09 workshop, Dec. 8-9, 2009.
Mikolajczyk, K., et al., "Action Recognition with Motion-Appearance Vocabulary Forest" Computer Vision and Pattern Recognition, 2008. CVPR 2008. IEEE Conference, pp. 1-8, Jun. 23-28, 2008.
Wang, X., et al., "Feature Context for Image Classification and Object Detection", Computer Vision and Pattern Recognition, (CVPR), 2011 IEEE Conference, pp. 961-968, Jun. 20-25, 2011.
Schuldt, C., et al., "Recognizing Human Actions: A Local SVM Approach", Pattern Recognition, 2004. ICPR 2004. Proceedings of the 17th International Conference, pp. 32-36, vol. 3, Aug. 23-26, 2004.
Wang, J., et al., "Locality-constrained Linear Coding for Image Classification", Computer Vision and Pattern Recognition (CVPR), 2010 IEEE Conference, pp. 3360-3367, Jun. 13-18, 2010.
Fan, X, et al., "Generative Models for Maneuvering Target Tracking", Accepted by IEEE Transactions on Aerospace and Electronic Systems, Dec. 2008.

* cited by examiner

*Primary Examiner* — Vikkram Bali (57) ABSTRACT

Aspects of the present invention include systems and methods for generating an optical flow-based feature. In embodiments, to extract an optical flow feature, the optical flow at sparse interest points is obtained, and Locality-constrained Linear Coding (LLC) is applied to the sparse interest points to embed each flow into a higher-dimensional code. In embodiments, for an image frame, the multiple codes are combined together using a weighted pooling that is related to the distribution of the optical flows in the image frame. In embodiments, the feature may be used in training models to detect actions, in trained models for action detection, or both.

15 Claims, 9 Drawing Sheets

|      | back   | down    | front  | left    | push   | right  | up      |
|------|--------|---------|--------|---------|--------|--------|---------|
| back | 96.67% | 0.00%   | 0.00%  | 0.00%   | 0.00%  | 3.33%  | 0.00%   |
| down | 0.00%  | 100.00% | 0.00%  | 0.00%   | 0.00%  | 0.00%  | 0.00%   |
| front| 0.00%  | 0.00%   | 63.33% | 0.00%   | 0.00%  | 36.67% | 0.00%   |
| left | 0.00%  | 0.00%   | 0.00%  | 50.00%  | 0.00%  | 50.00% | 0.00%   |
| push | 6.67%  | 0.00%   | 0.00%  | 0.00%   | 76.67% | 0.00%  | 16.67%  |
| right| 0.00%  | 3.33%   | 0.00%  | 0.00%   | 0.00%  | 96.67% | 0.00%   |
| up   | 0.00%  | 0.00%   | 0.00%  | 0.00%   | 0.00%  | 0.00%  | 100.00% |

Result using Object-based Feature

610

|      | back   | down   | front  | left   | push   | right  | up     |
|------|--------|--------|--------|--------|--------|--------|--------|
| back | 81.67% | 1.67%  | 6.67%  | 0.00%  | 0.00%  | 0.00%  | 10.00% |
| down | 0.00%  | 68.33% | 0.00%  | 3.33%  | 0.00%  | 3.33%  | 25.00% |
| front| 0.00%  | 8.33%  | 68.33% | 5.00%  | 1.67%  | 16.67% | 0.00%  |
| left | 0.00%  | 2.78%  | 19.44% | 72.22% | 0.00%  | 2.78%  | 2.78%  |
| push | 0.00%  | 10.00% | 1.67%  | 3.33%  | 83.33% | 0.00%  | 1.67%  |
| right| 0.00%  | 20.00% | 1.67%  | 6.67%  | 3.33%  | 51.67% | 16.67% |
| up   | 5.00%  | 23.33% | 8.33%  | 11.67% | 0.00%  | 0.00%  | 51.67% |

Result using Motion History Image

615

|      | back   | down    | front   | left    | push   | right  | up      |
|------|--------|---------|---------|---------|--------|--------|---------|
| back | 100.0% | 0.00%   | 0.00%   | 0.00%   | 0.00%  | 0.00%  | 0.00%   |
| down | 0.00%  | 100.0%  | 0.00%   | 0.00%   | 0.00%  | 0.00%  | 0.00%   |
| front| 0.00%  | 0.00%   | 100.0%  | 0.00%   | 0.00%  | 0.00%  | 0.00%   |
| left | 0.00%  | 0.00%   | 0.00%   | 100.00% | 0.00%  | 0.00%  | 0.00%   |
| push | 0.00%  | 0.00%   | 20.00%  | 0.00%   | 80.00% | 0.00%  | 0.00%   |
| right| 0.00%  | 0.00%   | 0.00%   | 6.70%   | 0.00%  | 93.30% | 0.00%   |
| up   | 0.00%  | 0.00%   | 0.00%   | 0.00%   | 0.00%  | 0.00%  | 100.0%  |

Result using of LLC & Max Pooling

620

|      | back    | down    | front   | left    | push    | right   | up      |
|------|---------|---------|---------|---------|---------|---------|---------|
| back | 100.00% | 0.00%   | 0.00%   | 0.00%   | 0.00%   | 0.00%   | 0.00%   |
| down | 0.00%   | 100.00% | 0.00%   | 0.00%   | 0.00%   | 0.00%   | 0.00%   |
| front| 0.00%   | 0.00%   | 100.00% | 0.00%   | 0.00%   | 0.00%   | 0.00%   |
| left | 0.00%   | 0.00%   | 0.00%   | 100.00% | 0.00%   | 0.00%   | 0.00%   |
| push | 0.00%   | 0.00%   | 20.00%  | 0.00%   | 100.00% | 0.00%   | 0.00%   |
| right| 0.00%   | 0.00%   | 0.00%   | 6.70%   | 0.00%   | 100.00% | 0.00%   |
| up   | 0.00%   | 0.00%   | 0.00%   | 0.00%   | 0.00%   | 0.00%   | 100.00% |

Result using of LLC & Weighted Pooling

FIGURE 6

PCA dimension vs performance

EMBEDDED OPTICAL FLOW FEATURES

CROSS-REFERENCE TO RELATED APPLICATIONS

This application claims the priority benefit under 35 USC §119(e) to commonly assigned and U.S. Patent Application No. 61/447,502, filed on Feb. 28, 2011, entitled "Simultaneously Segmentation and Recognition of Continuous Action Primitives" and listing as inventors Jinjun Wang and Jing Xiao. The aforementioned patent document is incorporated by reference herein in its entirety.

This application is related to commonly assigned and co-pending U.S. patent application Ser. No. 13/406,011, filed on the same day herewith, entitled "CONTINUOUS LINEAR DYNAMIC SYSTEMS," and listing as inventors Jinjun Wang and Jing Xiao. The aforementioned patent document is incorporated by reference herein in its entirety.

BACKGROUND

1. Field of Invention

The present patent document is directed towards systems and methods for generating and using optical flow-based features.

2. Description of the Related Art

Vision-based action recognition has wide application. For example, vision-based action recognition may be used in driving safety, security, signage, home care, robot training, and other applications.

One important application of vision-based action recognition is Programming-by-Demonstration (PbD) for robot training. In Programming-by-Demonstration, a human demonstrates a task that is desired to be repeated by a robot. While the human demonstrates the task, the demonstration process is captured in a video or videos by camera sensors. These videos are segmented into individual unit actions, and the action type is recognized for each segment. The recognized actions are then translated into robotic operations for robot training.

To recognize unit actions from video segments, reliable image features are extremely important. To be effective, the image features ideally should satisfy a number of criteria; such as, for example, they should be able to identify actions in different demonstration environments. Second, they should support continuous frame-by-frame action recognition. And, they should have low computational costs.

Prior attempts at feature matching include at least two types: temporal-template-based feature matching and local feature matching. Temporal-template-based feature matching includes such methods as moving object silhouettes, average flow frame, motion energy image, and motion history image. These methods typically work well for simple actions. However, they have some significant drawbacks. For example, they typically require object detection/background subtraction and time-wrapping to handle variable action duration for recognition. Such methods are also difficult to apply for continuous action recognition.

Local feature matching includes such methods as histogram of oriented optical flow (HOOF) and spatial-temporal interest point (STIP). These methods tend to have the benefit of being fast and more robust on dynamic backgrounds. However, these methods also tend to be extremely sparse for smooth actions. In fact, some actions do not produce distinctive features. Also, these methods tend to have large quantization error.

Accordingly, systems and methods are needed that provide improved image feature representation.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 6 depicts four sets of results performed using four different methodologies including using one methodology that utilized EOF features according to embodiments of the present invention.

SUMMARY OF INVENTION

The present invention comprises systems and methods for generating embedded optical flow features. Embodiments also include using the embedded optical flow feature for model training and/or detection purposes. Embodiments of the present invention include methods that have been encoded upon one or more computer-readable media with instructions for one or more processors or processing units to perform. The method may include a plurality of instructions that are executed by one or more processors or processing units.

Disclosed herein are embodiments of reliable image features, referred to herein as Embedded Optical Flow (EOF) features. In embodiments, the EOF feature is based on embedding optical flow at interest points using Locality-constrained Linear Coding with weighted average pooling. In embodiments, the EOF feature is histogram-like but presents excellent linear separability. In embodiments, the EOF feature is able to take advantage of both global and local information by being spatially "global" and temporally "local." EOF is spatially global in that it considers the distribution of optical flow information from each of a set of frames, and it is also temporally local in that it represents individual frames. In embodiments, the temporal evolution of EOF may be modeled by a sequential classifier.

In embodiments, a computer-implemented method for generating an EOF comprises obtaining a set of local motion features, or optical flows, for an image frame from a video or other sensor data. For each local motion feature from a set of local motion features, a sparse coding vector is generated and the EOF is formed to represent the image frame by a weighted pooling of the sparse coding vectors, wherein the weighting is based upon a distribution of local motion features in the image frame.

In embodiments, the weighted pooling may be done by pooling sparse coding vectors for the image frame by weighting each sparse coding vector in relation to a posterior of a local motion feature corresponding to the sparse coding vector. In embodiments, the weighted pooling may be done by weighting each sparse coding vector by an inverse proportional to a square root of a posterior of a local motion feature corresponding to the sparse coding vector. For example, in embodiments, the equation, $$y = CP_o^{-\frac{1}{2}}(X),$$

may be used to generate the feature, where y represents the image feature for the image frame, C represents a matrix of spare coding vectors for the image frame, $P_o(X)$ represents a matrix of posterior values for local motion features. In embodiments, the pooled sparse coding vectors are also normalized to form the image feature.

In embodiments, Locality-constrained Linear Coding (LLC) and a codebook may be used to generate spares coding vectors. In embodiments, at least some of the local motion vectors, or optical flows, may be used to generate a codebook.

In embodiments, the method may include extracting frames from a video.

In embodiments, the method may include extracting feature points from the frames in order to obtain optical flows for the frames.

In embodiments, the EOF features may be used to train a model for action detection, may be used by a trained model for detecting one or more actions, or both.

It shall be noted that although embodiments described herein have been within the context of video data, the invention elements of the current patent document are not so limited. Accordingly, the invention elements may be applied in other context and on other input sensor data.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall be noted that the use of the term "set" in this patent document shall include any number of elements.
Background For feature representation, many existing works use global motion features, such as "action sketch," "action signatures," space-time saliency/orientation, and weighted moments. These global motion features strongly depend on object segmentation quality, which influences the robustness of classification.

Local motion features are typically more robust against noise by using spatio-temporal descriptors at local interest points, such as Space-Time Interest Points (STIP), three-dimensional (3D) interest points, space-time shapes, gradient descriptor, and "local motion signature." To represent an action, the local descriptors are either put in an orderless bag-of-words or tracked over frames to compensate the loss of temporal information. Since the global characteristics of the action is not observable at local spatial window, they are discarded in these local motion-based methods. More importantly, the size of the "bag" is unknown when analyzing continuous video because action segmentation and classification have to be done simultaneously.

To take the advantages of both global and local information, this patent document sets forth embodiments of a feature, which may be referred to herein as the Embedded Optical Flow (EOF), that is spatially "global" and temporally "local." In embodiments, the Embedded Optical Flow is spatially global in that it considers the distribution of optical flow information from each video frame of a set of frames. In embodiments, it is also temporally local in that it represents individual frames. And, in embodiments, the temporal evolution of EOF may be modeled by a sequential classifier. For example, the EOF feature may apply to a number of sequential classifiers, including but not limited to the one introduced in commonly assigned and co-pending U.S. patent application Ser. No. 13/406,011 further identified above.

General Overview

Figure 1:
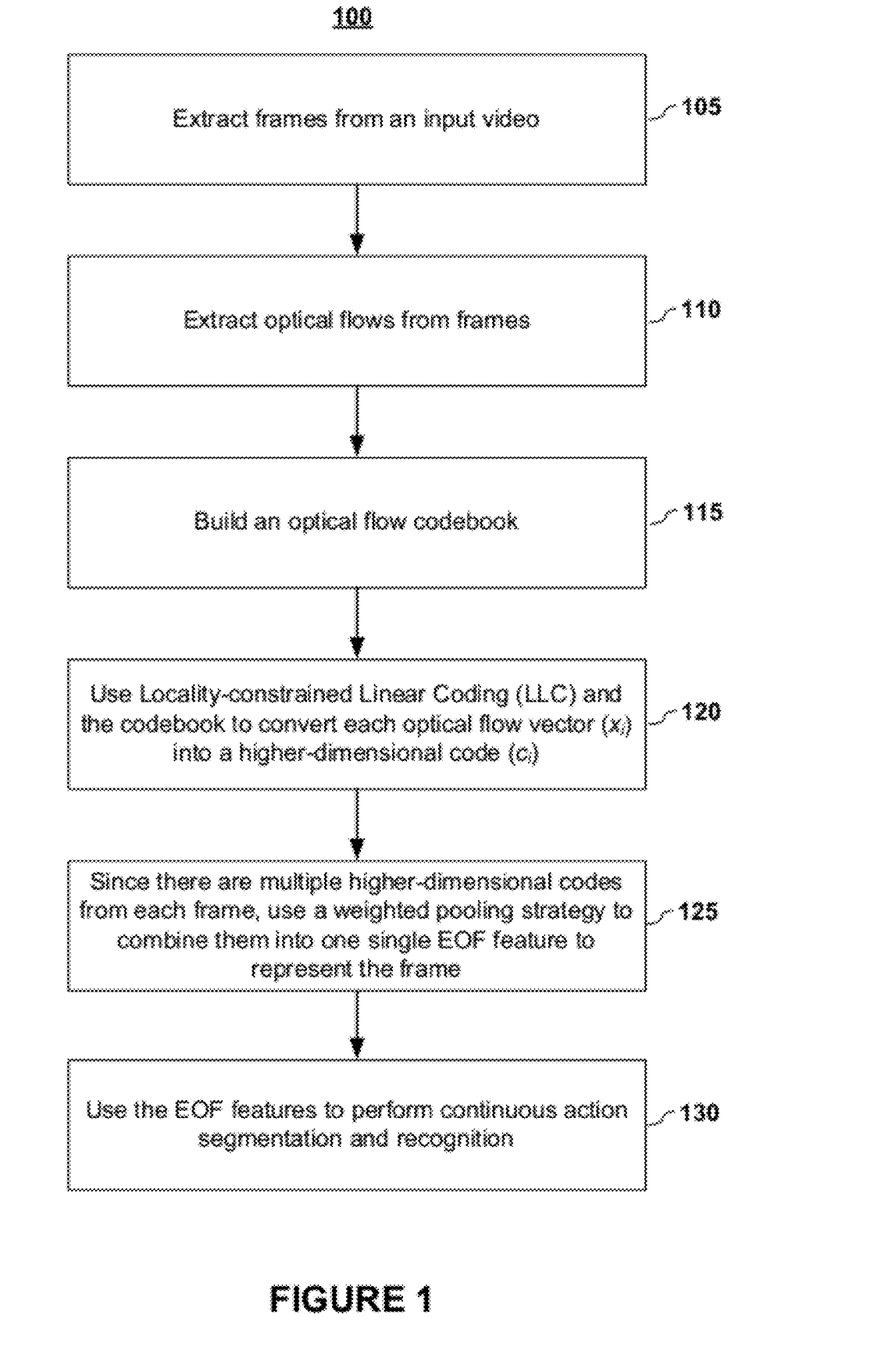
FIG. 1 depicts an embodiment of the general methodology for generating and for using an Embedded Optical Flow according to embodiments of the present invention.

FIG. 1 depicts an embodiment of the general methodology for generating and for using an Embedded Optical Flow according to embodiments of the present invention. As depicted in FIG. 1, the process commences by extracting (105) image frames from an input video or other sensor. In embodiments, spatial pyramid technique may be applied, where the image frame may be divided into two or more sections and one or more of the subsequent steps may be processed by sections.

Having extracted frames from the input video, optical flows are extracted (110) from the frames. In embodiments, the optical flow may be computed using, by way of example and not limitation, Harris interest point detection to detect feature point from the frames and a Lucas-Kanade method to calculate the optical flow for each feature point. In embodiments, motion information is represented based on optical flows because they are fast to compute and robust against many transforms. It shall be noted that for purposes of explanation two-dimensional (2D) examples are depicted herein; however, it shall be noted that the systems and methods may be applied to different dimensionalities.

Figure 2:
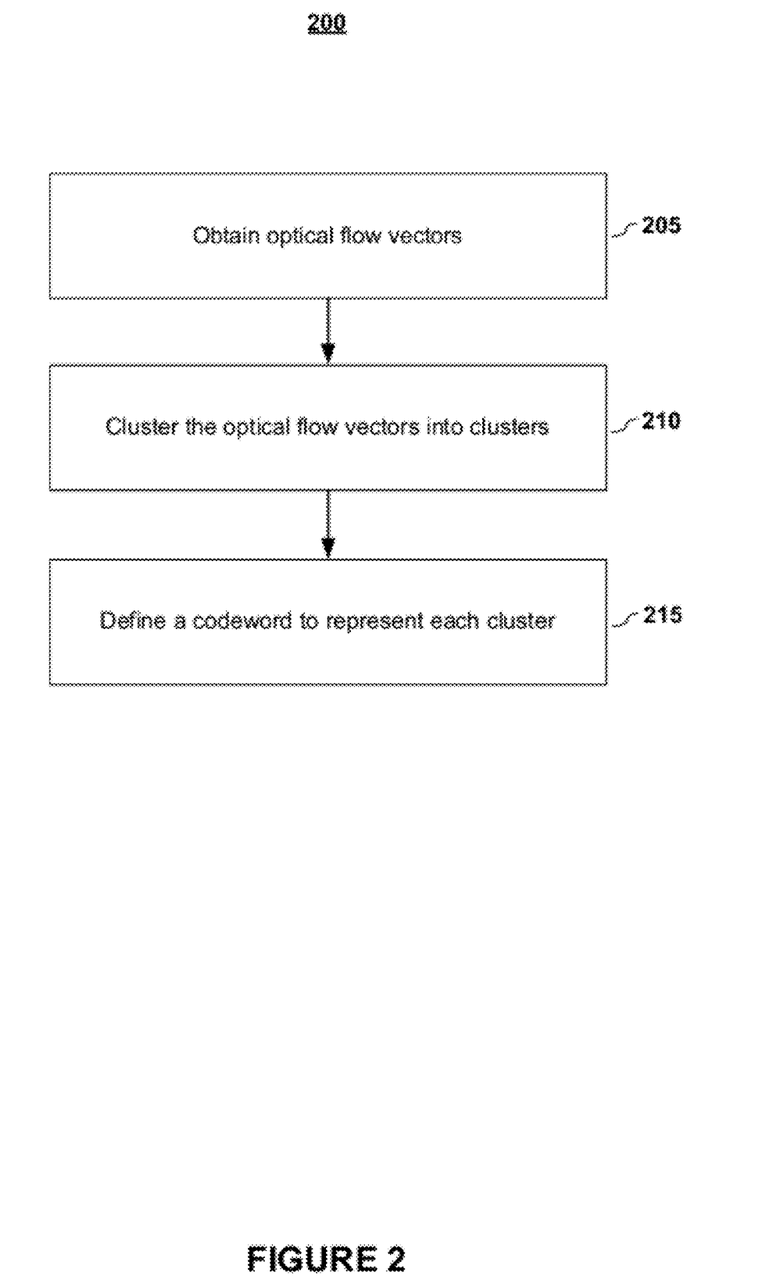
FIG. 2 depicts an embodiment of a method for generating a codebook according to embodiments of the present invention.

Embodiments of the EOF methodology utilize an optical flow codebook. In embodiments, the optical flow codebook may be a previously generated codebook. Alternatively, in embodiments, a small set of frames may be used to provide training samples to build the optical flow codebook. In embodiments, a codebook may be generated if the optical flow in the testing/detecting video exhibits significantly different distributions from the training frames. Such situations usually happen with the change of task environment factors, such as the set of actions to be recognized, the parameters of camera or sensor, the complexity of background, etc. FIG. 2 depicts an embodiment of a method for generating a codebook according to embodiments of the present invention.

Figure 3:
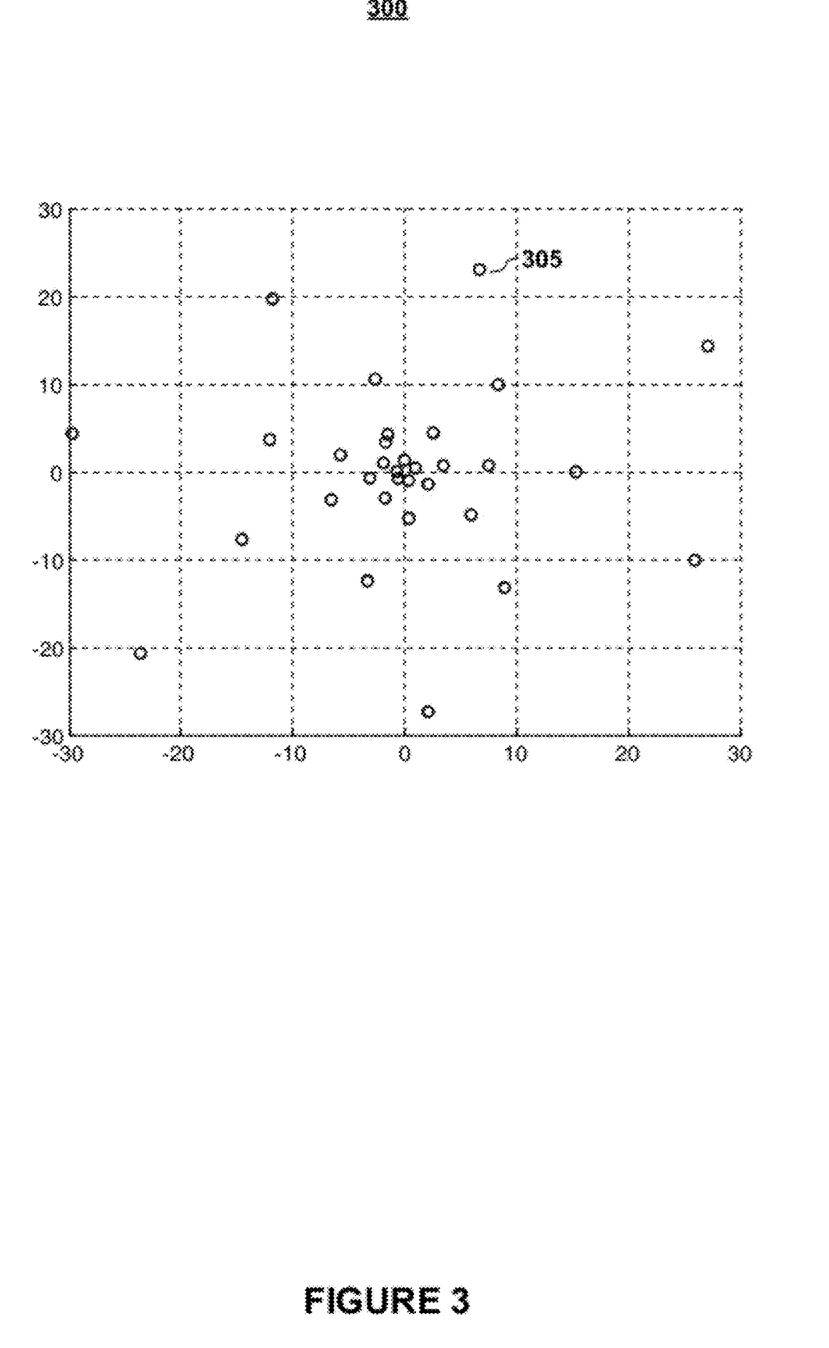
FIG. 3 depicts an example of a set of learned codewords, which form a codebook, according to embodiments of the present invention.

As shown in FIG. 2, a method for generating an optical flow codebook commences by obtaining (205) a set of optical flows. These optical flows are then grouped (210) into a set of clusters. In embodiments, the optical flows may be grouped using a K-Means clustering methodology, which clustering methods are well known to those of ordinary skill in the art. The number of clusters may be user defined or based upon experiments. In embodiments, the optical flow codebook may comprise 32 clusters. For each cluster, a codeword is defined (215) to represent the cluster. In embodiments, the codeword for a cluster may be a centroid or an average (mean, median, or mode) of the optical flows that are associated with the cluster. One skilled in the art shall recognize that other methodologies may be used to generate or obtain a codebook. FIG. 3 depicts an example of a set 300 of learned codewords, which form a codebook, according to embodiments of the present invention. Each circle (e.g., 305) represents a centroid of a cluster of optical flows (not shown).

Returning to FIG. 1, using the codebook, a Locality-constrained Linear Coding (LLC) is applied to embed each optical flow into a higher-dimensional code. Although LLC methods are well known to those of ordinary skill in the art, presented below are embodiments for obtaining codes from the optical flows using LLC.

Coding Optical Flows

Figure 4:
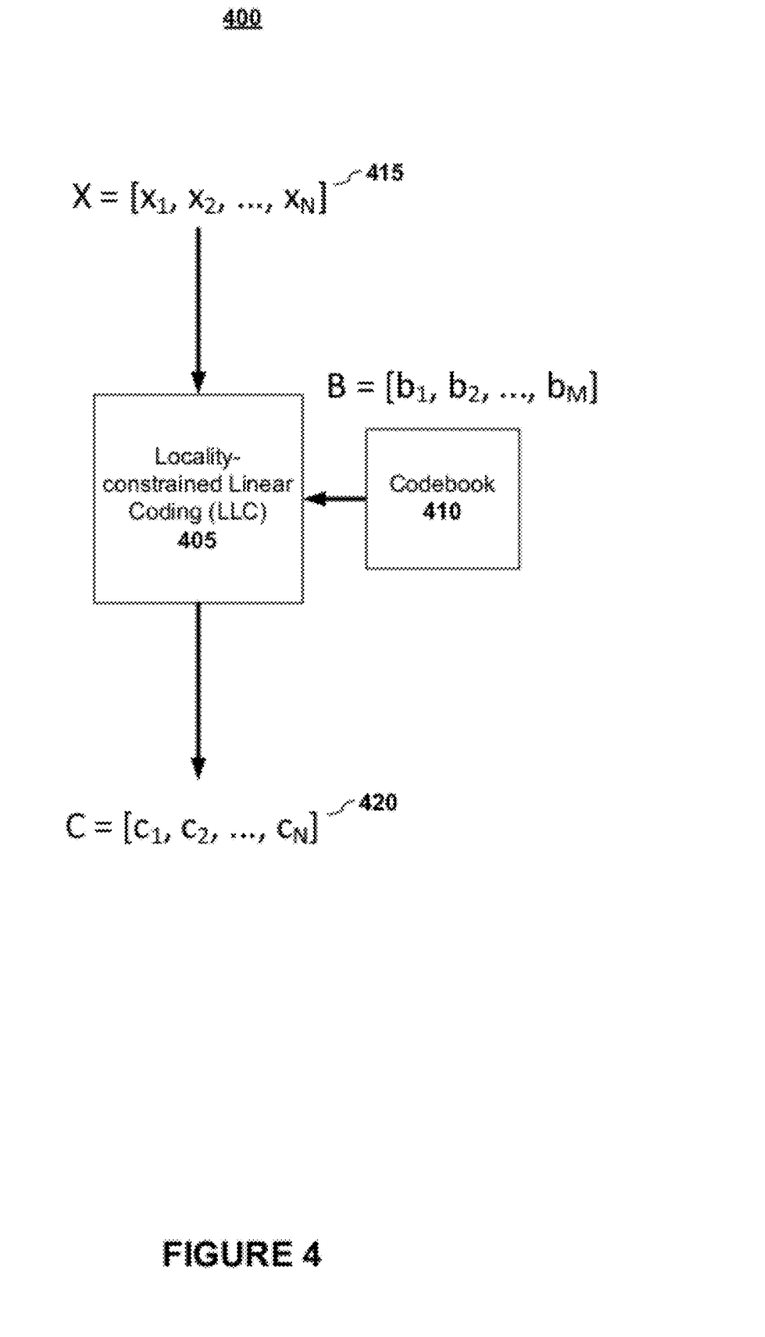
FIG. 4 graphically depicts a process flow for generating higher-dimensional codes for the optical flows according to embodiments of the present invention.

FIG. 4 graphically depicts a process flow for generating higher-dimensional codes, or sparse coding vectors, for the optical flows according to embodiments of the present invention. The LLC 405 receives a set of optical flow vectors denoted as $X=[x_1, x_2, \ldots, x_N] \in \mathbb{R}^{2 \times N}$ 415, for a given codebook with M entries, $B=[b_1, b_2, \ldots, b_M] \in \mathbb{R}^{2 \times M}$ 410. As explained below, the LLC coding-based process converts each optical flow vector $x_i$ into a corresponding higher-dimensional code $c_i \in \mathbb{R}^M$ 420.

In embodiments, the coding step solved the following criteria in general:

$$C^* = \underset{C}{\operatorname{argmin}} \sum_{i=1}^{N} \|x_i - Bc_i\|^2 + \lambda \Psi(c_i), \quad (1)$$

$$\text{s.t. } \Omega(c_i) = 0 \,\forall\, i$$

It can be found that, using the vector quantization (VQ) criteria, i.e., $\Omega(c_i): \|c_i\|_{l^0}=1$, $\|c_i\|_{l^1}=1$, & $c_i \geq 0$, and average pooling, $\bar{c}$ becomes a histogram of optical flow. In embodiments, the LLC coding uses a different regularization term $\Psi(c_i)$ to enforce locality, and the criteria equals to solving the following objective:

$$\tilde{C}^* = \underset{\tilde{C}}{\operatorname{argmin}} \sum_{i=1}^{N} \|x_i - B_i \tilde{c}_i\|^2, \quad (2)$$

$$\text{st. } 1^T \tilde{c}_i = 1 \,\forall\, i,$$

where $B_i$ contains the k nearest neighbors of $x_i$ from B.

Weighted Pooling

Returning to FIG. 1, since there are multiple higher-dimensional codes from each frame, aspects of the current method include using (125) a weighted pooling strategy to combine the multiple higher-dimensional codes for a frame so that a single feature vector can be used to represent the frame. That is, a pooling step $f(\bullet)$ combines multiple codes into one single feature vector $\bar{c}=f(C)$.

To combine multiple LLC codes into the final image feature, prior methods have used max-pooling. It has been shown that that max-pooling is well suited for highly overcompleted codebook where codewords have low probability of being active. However, such is not the case where an observed optimal codebook size is relatively small. Also, an optical flow is likely not that reliable as compared to SIFT or HOG descriptors; max-pooling becomes very sensitive to noise.

To overcome these limitations, embodiments herein utilize different pooling strategies to further improve the performance of measuring the distance between two image features by linearly combining the per-point contribution, and linear distance measure is sufficient. Existing histogram-type features based on average-pooling use non-linear distance metric to achieve good performance, such as the $\chi^2$ distance based on KL divergence. The Bhattacharyya distance has also been used to measure the distance between two distribution of local image patches, which leads to the following criteria:

$$f(C) = \sum_{i=1}^{N} \left\| \frac{c_i}{\sqrt{P_o(x_i)}} \right\| \quad (3)$$

where the weight of code $c_i$ is inversely proportional to the square root of $P_o(x_i)$, which is the posterior of $x_i$.

In embodiments, to adopt Equation (3) for the EOF feature, a challenge is how to obtain $P_o(x_i)$ that is not readily available as that in Gaussian mixture model (GMM). In embodiments, computing $P_o(x_i)$ may be performed as follows. The method starts from uniform prior for each descriptor $x_i$ and basis vector $b_j$, i.e., $$P_r(x_i) = \frac{1}{N} \text{ and } P_r(b_i) = \frac{1}{M}.$$

The generative model from $b_j$ to $x_i$ is initially assumed to be a Gaussian, i.e., $$P(x_i | b_j) = \exp\left(\frac{-\|x_i - b_j\|^2}{\sigma^2}\right), \quad (4)$$

where $\sigma$ is a bandwidth parameter. Then, $$P(b_j | x_i) = \frac{P(x_i | b_j) P_r(b_j)}{\sum_k P(x_i | b_k) P_r(b_k)} = \frac{P(x_i | b_j)}{\sum_k P(x_i | b_k)} \quad (5)$$

Experiments indicate that smaller a gives better accuracy, and the best performance is achieved when Equation (4) reduces to a Dirac Delta function. In embodiments, this may be approximated using Hard-VQ where $P(b_j|x_i)=1$ if $j=j^*$ the quantization bin, and 0 otherwise. Then, the posterior of each basis vector (a histogram) is $$P_o(b_j) = \frac{1}{N} \sum_i P(b_j | x_i) = \frac{1}{N} \text{sum}(j = j^*)$$

And $P_o(x_i)$ may be computed by:

$$P_o(x_i) = \sum_j P(x_i | b_j) P_o(b_j) = P(x_i | b_{j^*}) P_o(b_{j^*}) = P_o(b_{j^*}) \quad (6)$$

Finally, $$y = C P_o^{-\frac{1}{2}}(X)$$

is the EOF feature from image I, where $$P_o^{-\frac{1}{2}}(X) \doteq \left[P_o^{-\frac{1}{2}}(x_1), P_o^{-\frac{1}{2}}(x_2), \ldots, P_o^{-\frac{1}{2}}(x_N)\right]^T.$$

Figure 5:
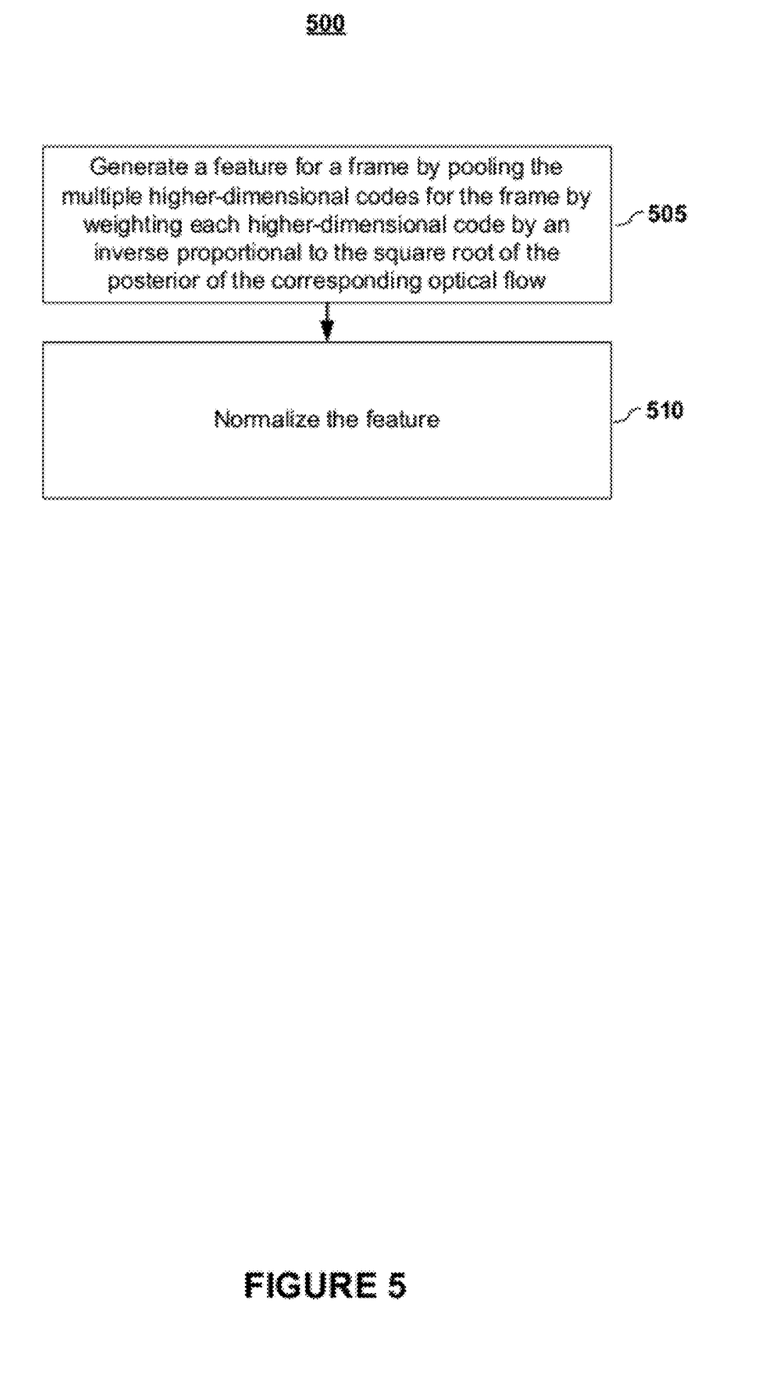
FIG. 5 depicts a weighted pooling strategy according to embodiments of the present invention.

FIG. 5 depicts a weighted pooling strategy according to embodiments of the present invention. As shown in FIG. 5, a feature to represent a frame may be generated by pooling (505) the multiple higher-dimensional codes for the frame by weighting each higher-dimensional code by an inverse proportional to the square root of the posterior of the corresponding optical flow, as explained above. Also, in embodiments, each feature is normalized (510), which may be performed as follows:

$$y_{norm} = \frac{y}{\|y\|_2}$$

Returning to FIG. 1, after a continuous video is converted into an EOF time series, the EOF time series may be used (130) in systems and methods to perform continuous action segmentation and recognition.

It shall be noted that EOF feature is quite different from prior approaches. As compared to HOOF, embodiments of the methodologies of the current patent document do not generate a histogram to represent the frame. And, as compared to STIP, embodiments of the methodologies of the current patent document do not use temporal interest point but use spatial interest point, which allow for the temporal pattern to be modeled by classifier.

It shall also be noted that histogram-type features based on optical flow have been used in describing motion for action recognition. Since histograms are non-Euclidean, modeling the evolution of histogram requires non-linear sequential models, such as a Non-Linear Dynamic System using Binet-Cauchy kernel. Unlike traditional histogram-type feature that is based on Vector Quantization (VQ), coding based image feature has better linear separability as proven by recent works in image classification. Since EOF is based on the LLC coding, its temporal evolution can be accurately described using linear models. It shall be noted that there has been no prior work on using first-order coding criteria (such as LLC) to represent a frame for action recognition. It shall also be noted that the weighted pooling methods for the EOF feature outperforms the original LLC feature. This makes simultaneously segmentation and recognition of continuous primitive actions achievable using a linear classification model.

Results and Experiments

Results are presented herein to demonstrate possession of the inventive aspects presented in the current patent document and to demonstrate its improved results over prior methods. These results were performed using specific embodiments and under specific conditions; accordingly, nothing in these results sections shall be used to limit the inventions of the present patent document. Rather, the inventions of the present patent document shall embrace all alternatives, modifications, applications and variations as may fall within the spirit and scope of the disclosure.

FIG. 6 depicts four sets of results performed using four different methodologies including using one methodology that utilized EOF features according to embodiments of the present invention. The first results 605 were generated using an object-based feature. Note that for some of the actions, such as left-left, the results were only about 50% effective. The second results 610 were generated using motion history image methodology. Note that for some of the actions, such as right-right and up-up, the results were only about 52% effective. The third group of results 615 were generated using LLC and max pooling. Note that for some of the actions, such as push-push and right-right, the results were about 80% and 93% effective, respectively. The last set of depicted results 620 were obtained using an embodiment of the current invention and produced results for all of the actions at 100%.

Primitive Action Classification.

It shall be noted that the EOF feature, like other image features, may be used for classification, which is well known to those of ordinary skill in the art. By way of illustration and not limitation, presented below are the results of using an embodiment of EOF features in classification. By way of comparison, the results of using the EOF feature for classification are compared against classifications that to do use the EOF features.

Two public datasets, specifically the Idiap dataset (see, for example, A. Just and S. Marcel, "Two-Handed Gesture Recognition," IDIAP Research Report 24, IDIAP Research Inst., 2005 (hereinafter, "Reference 1"), which is incorporated herein by reference in its entirety) and the IXMAS dataset (see, for example, D. Weinland and E. Boyer, "Action recognition using exemplar-based embedding," in Proc. of Computer Vision and Pattern Recognition (CVPR '08), 1-7, 2008 (hereinafter, "Reference 2"); and D. Weinland, R. Ronfard, and E. Boyer, "Free Viewpoint Action Recognition Using Motion History Volumes," Computer Vision and Image Understanding (CVIU), 2006 (hereinafter, "Reference 3"), each of which is incorporated herein by reference in its entirety), were used to test the EOF feature for action classification. To extract the EOF feature, the LLC codebook used 32 optical flow codewords obtained by KMean, and pooling were performed in 4×4, 2×2, and 1×1 spatial pyramid (see, e.g., S. Lazebnik, C. Schmid, and J. Ponce, "Beyond bags of features: Spatial pyramid matching for recognizing natural scene categories," in Proc. of Computer Vision and Pattern Recognition (CVPR '06), vol. 2, pp. 2169-2178, 2006, which is incorporated herein by reference in its entirety). The dimension of EOF feature was 672 per camera view.

For the Idiap dataset, the dataset consists of seven two-handed manipulation gestures performed by seven people, with two sessions and five video sequences per session and per gesture. Principal component analysis (PCA) was applied to reduce the dimension of EOF to 24, and the classification results are listed in Table 1 (below) in comparison with the results from three other methods, using the training/testing partition suggested in Reference 1. The three other methods were those used in: (1) Reference 1; (2) O. Arana and L. Akarunb, "A multi-class classification strategy for fisher scores: Application to signer independent sign language recognition," Pattern Recognition 43(5), 2010 (hereinafter, "Reference 4"), which is incorporated herein by reference in its entirety; and (3) S. Nayak, S. Sarkar, and B. Loeding, "Distribution-based dimensionality reduction applied to articulated motion recognition," Pattern Analysis and Machine Intelligence (PAMI), 31(5), 795-810, 2009 (hereinafter, "Reference 5"), which is incorporated herein by reference in its entirety. In these works, the features used were based on tracking and segmenting the hands to derive object-based features, such as center and shape of the hand blob (Reference 1) or contour pixels of hands (Reference 5), while EOF uses optical flow at sparse interest points. Using either Linear Dynamic Systems (LDS) or hidden Markov model (HMM), EOF feature achieved the best 100% accuracy.

TABLE 1

Classification accuracy (in %) using Idiap dataset

| method | Average |
|---|---|
| Baseline with HMM [Ref. 1] | 98.8 |
| Aran and Akarun [Ref. 4] | 99.6 |
| Nayak et al. [Ref. 5] | 98.0 |
| EOF with HMM | 100.0 |
| EOF with LDS | 100.0 |

For the IXMAS dataset, the dataset contains 11 actions, each performed three times by ten actors. The dataset is view-invariant because the acquisition used five cameras from different angles, and the actors freely changed their orientation for each acquisition. The provided background images were used to extract the bounding box of the subject. Then, with either sparse feature point detection or dense sampling, four different settings for the EOF feature were obtained: dense/sparse+frame/bounding box (see Table 2, below). PCA was applied to reduce the dimension of EOF to 48, and LDS classifier was used. The leave-one subject-out single-view cross-validation procedure suggested by D. Weinland and E. Boyer in Reference 2 was followed. As can be seen from Table 2, with simple optical flow input, the EOF feature gives comparable performance with more complicated feature such as body silhouettes matching and exemplar matching. Most importantly, these more complicated features require a pre-segmentation step for continuous action recognition as noted in Reference 2, while EOF can support simultaneous action recognition and boundary segmentation.

TABLE 2

Classification accuracy (in %) using IXMAS dataset

| method | cam. 0 | cam. 1 | cam. 2 | cam. 3 | cam. 4 | average |
|---|---|---|---|---|---|---|
| Junejo [Ref. 6] | 74.8 | 74.5 | 74.8 | 70.6 | 61.2 | 71.2 |
| Yan [Ref. 7] | 72.0 | 53.0 | 68.0 | 63.0 | — | — |
| Liu [Ref. 8] | 86.6 | 81.1 | 80.1 | 83.6 | 82.8 | 82.8% |
| Weinland [Ref. 2] | 85.8 | 86.4 | 88.0 | 88.2 | 74.7 | 83.5% |
| EOF (SF) | 69.6 | 69.5 | 73.6 | 76.6 | 62.5 | 70.3 |
| EOF (DF) | 80.6 | 78.6 | 83.3 | 74.6 | 71.7 | 77.7 |
| EOF (SB) | 71.7 | 68.6 | 69.6 | 72.5 | 60.0 | 68.5 |
| EOF (DB) | 82.2 | 82.3 | 85.1 | 82.2 | 77.6 | 81.9 |

Figure 7:
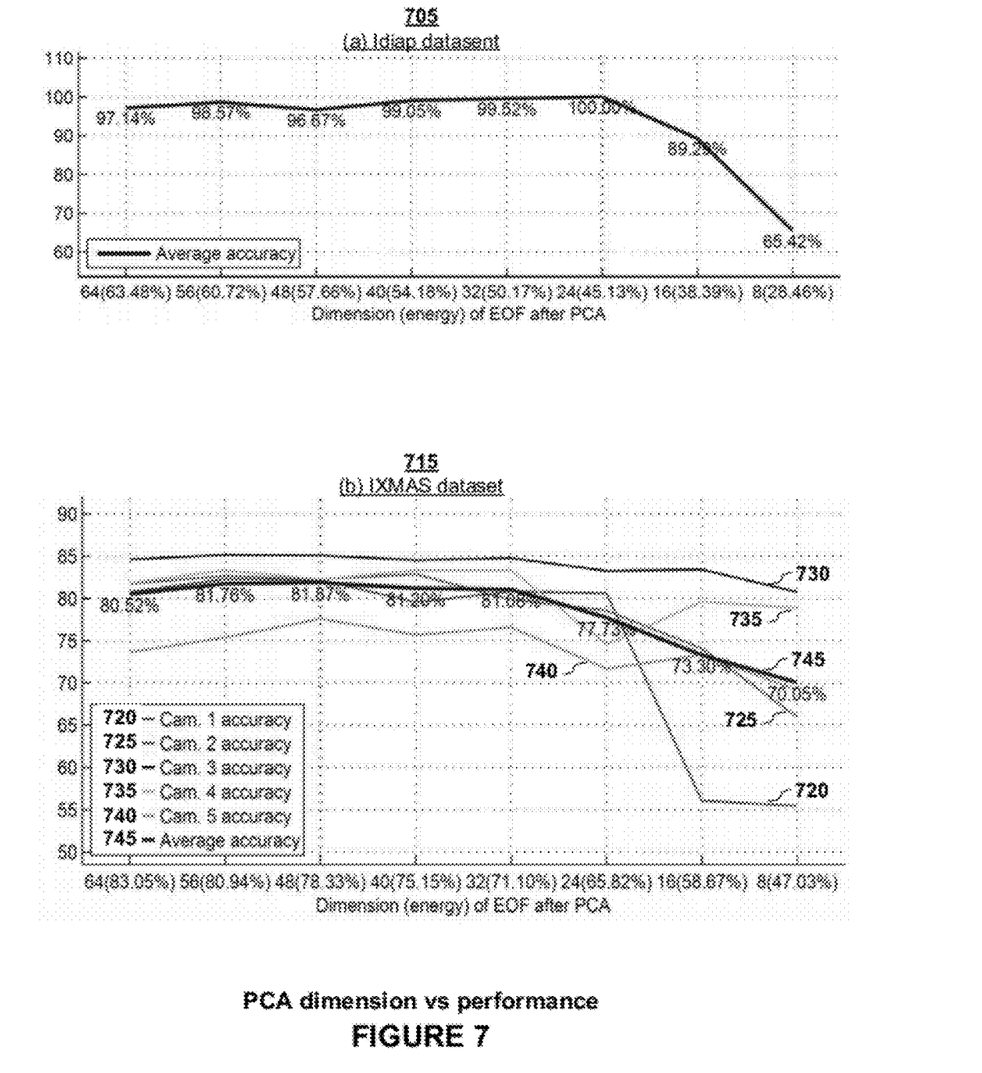
FIG. 7 shows the effect of PCA dimension for both the Idiap dataset and the IXMAS dataset according to embodiments of the present invention.

Where: SF=Sparse feature point from whole Frame; DF=Dense feature points from the whole Frame; SB=Sparse feature point from the Bounding box; and DB=Dense feature points from the Bounding box of subject. Reference 6 is I. Junejo, E. Dexter, I. Laptev, and P. Prez, "Cross-view action recognition from temporal self-similarities," in Proc. of European Conference on Computer Vision (ECCV'08), 2008, which is incorporated herein by reference in its entirety. Reference 7 is P. Yan, S. Khan., and M. Shah, "Learning 4D action feature models for arbitrary view action recognition," in Proc. of Computer Vision and Pattern Recognition (CVPR'08), 2008, which is incorporated herein by reference in its entirety. And, Reference 8 is J. Liu, M. Shah, B. Kuipers, and S. Savarese, "Cross-view action recognition via view knowledge transfer," in Proc. of Computer Vision and Pattern Recognition (CVPR'11), 2011, which is incorporated herein by reference in its entirety To provide more insight of the EOF feature, FIG. 7 shows the effect of PCA dimension for both the Idiap dataset 705 and the IXMAS dataset 715, and in Table 3, the coding and the pooling process for EOF is examined by comparing it with two other features, using the same set of optical flow, codebook, and spatial pyramid. The first is a bag-of-word feature that is a histogram of optical flow from each frame (see, e.g., R. Chaudhry, et al., "Histograms of oriented optical flow and Binet-Cauchy kernels on nonlinear dynamical systems," in Proc. of CVPR'09, 2009, which is incorporated herein by reference in its entirety). The second is an original LLC feature based on max-pooling. Wang et al. (J. Wang, J. Yang, F. Lv, and K. Yu, "Locality-constrained linear coding for image classification," in Proc. of CVPR'10, 2010, which is incorporated herein by reference in its entirety) demonstrated the superior performance of LLC over histogram-type feature for image classification, and these experiments produced similar results for action recognition, where LLC feature outperformed VQ in most testing cases. In addition, comparison between EOF and LLC shows that, weighted average pooling is very effective for small codebook size and noisy descriptors such as optical flow.

TABLE 3

Comparison results (in %)

| method | Idiap average | IXMAS | | | | | |
| --- | --- | --- | --- | --- | --- | --- | --- |
| | | cam. 0 | cam. 1 | cam. 2 | cam. 3 | cam. 4 | average |
| VQ | 91.9 | 76.9 | 78.8 | 81.2 | 77.4 | 70.3 | 77.1 |
| LLC | 98.1 | 77.9 | 78.9 | 81.4 | 77.4 | 79.6 | 79.1 |
| EOF | 100 | 82.2 | 82.3 | 85.1 | 82.2 | 77.6 | 81.9 |

System Embodiments

Figure 8:
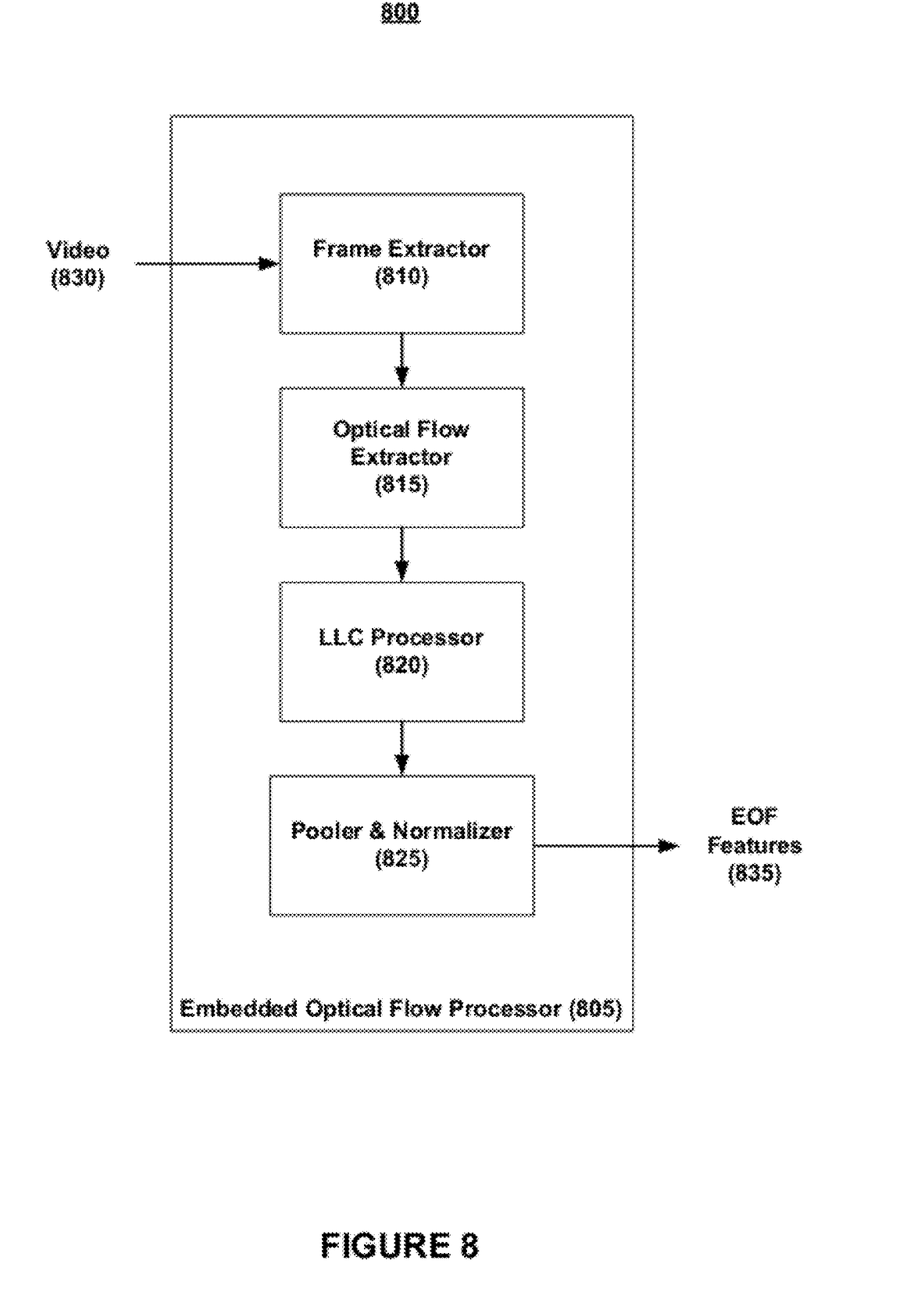
FIG. 8 depicts a system for generating embedded optical flow features according to embodiments of the present invention.

FIG. 8 depicts a system 805 for generating embedded optical flow features according to embodiments of the present invention. The embedded optical flow processor 805 receives as input video or other sensor data 830 and outputs embedded optical flow features 835. In embodiments, the embedded optical flow processor comprises a feature extractor 810, an optical flow extractor 815, a Locality-constrained Linear Coding (LLC) processor 820, and a weighted pooler and normalizer 825.

In embodiments, the frame extractor 810 receives the input video 835 and extracts frames from the video. The optical flow extractor 815 receives the frames and extracts optical flow vectors from the frames. In embodiments, the optical flow may be computed using, by way of example and not limitation, Harris interest point detection to detect feature point from the frames and a Lucas-Kanade method to calculate the optical flow for each feature point.

The LLC processor 820 receives the optical flows from the optical flow extractor 815 and uses the optical flows to generate higher-order codes. In embodiments, the LLC uses a codebook and one or more of the LLC methods disclosed above to convert the optical flows (e.g., $x_i$) into codes (e.g., $c_i$).

The pooler and normalizer 825 receives the optical flows and corresponding codes. In embodiments, for each of a set of frames from the input video, the pooler and normalizer 825 pools the codes for the frame by weighting them based upon the distribution of the optical flows in the image frame. In embodiments, each higher-dimensional code for a frame is weighted by an inverse proportional to the square root of the posterior of the corresponding optical flow, as discussed above. Finally, in embodiments, the pooler and normalizer 825 normalizes each of the pooled features to form the embedded optical flow features for the input video.

In embodiments, the embedded optical flow features may be used as features for training a system or systems for action segmentation and/or for action detection.

Figure 9:
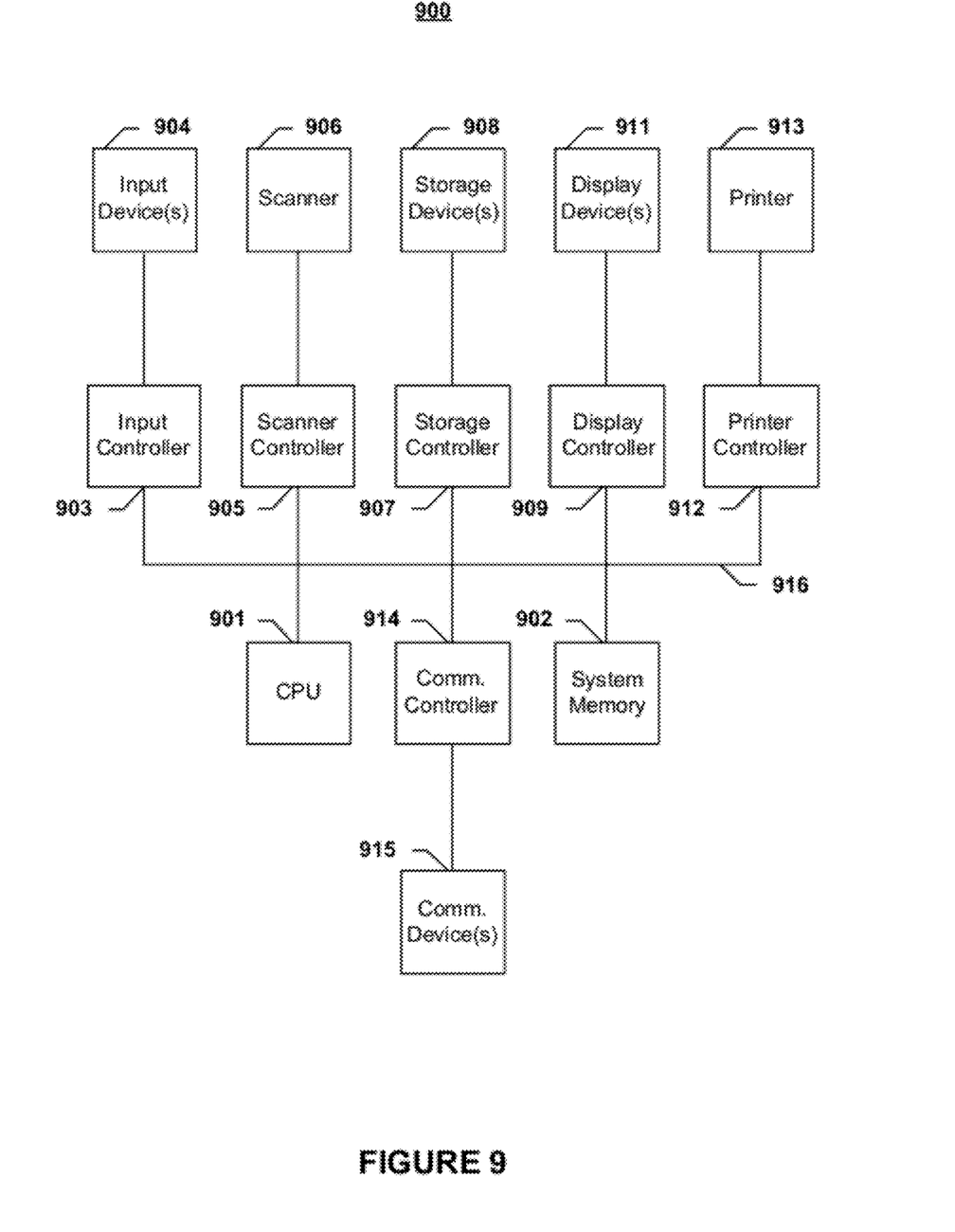
FIG. 9 depicts a block diagram illustrating an exemplary system which may be used to implement aspects of the present invention.

Having described the details of the invention, an exemplary system 900, which may be used to implement one or more aspects of the present invention, will now be described with reference to FIG. 9. As illustrated in FIG. 9, the system includes a central processing unit (CPU) 901 that provides computing resources and controls the computer. The CPU 901 may be implemented with a microprocessor or the like, and may also include a graphics processor and/or a floating point coprocessor for mathematical computations. The system 900 may also include system memory 902, which may be in the form of random-access memory (RAM) and read-only memory (ROM).

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. The system 900 may also include a storage controller 907 for interfacing with one or more storage devices 908 each of which includes a storage medium such as magnetic tape or disk, or an optical medium that might be used to record programs of instructions for operating systems, utilities and applications which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, or other type of display. The system 900 may also include a printer controller 912 for communicating with a printer 913. A communications controller 914 may interface with one or more communication devices 915, which enables the system 900 to connect to remote devices through any of a variety of networks including the Internet, a local area network (LAN), a wide area network (WAN), or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that non-transitory computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A computer-implemented method comprising:
   obtaining a set of local motion features for an image frame stored in a memory;
   for each local motion feature from the set of local motion features, generating a sparse coding vector; and
      forming an image feature that represents the image frame by pooling the sparse coding vectors based upon a weighting of a distribution of local motion features in the image frame, including:
         generating the image feature for a frame by pooling sparse coding vectors for the image frame by weighting each sparse coding vector in relation to a posterior of a local motion feature corresponding to the sparse coding vector, including weighting each sparse coding vector by an inverse proportional to a square root of a posterior of a local motion feature corresponding to the sparse coding vector.

2. The computer-implemented method of claim 1 wherein weighting each sparse coding vector in relation to a posterior of a local motion feature corresponding to the sparse coding vector comprises:
   using an equation:

$$y = CP_o^{-\frac{1}{2}}(X),$$

where y represents the image feature for the image frame, C represents a matrix of spare coding vectors for the image frame, $P_o(X)$ represents a matrix of posterior values for local motion features.

3. The computer-implemented method of claim 1 wherein the step of forming an image feature that represents the image frame by pooling the sparse coding vectors based upon a weighting of the distribution of local motion features in the image frame further comprises:
   normalizing the pooled sparse coding vectors to form the image feature.

4. The computer-implemented method of claim 1 wherein the step of generating a sparse coding vector comprises:
   using Locality-constrained Linear Coding (LLC) and a codebook to generate the spares coding vector.

5. The computer-implemented method of claim 1 wherein the method further comprises:
   using the image feature to recognize an action.

6. A non-transitory computer-readable medium or media comprising one or more sequences of instructions which, when executed by one or more processors, causes steps for forming an optical flow feature to represent an image in a video comprising:
   for each frame from a set of frames from the video:
      extracting optical flows from the frame;
      using Locality-constrained Linear Coding (LLC) and an optical flow codebook to convert each optical flows into a higher-dimensional code; and
      using a weighted pooling to combine the higher-dimensional codes into the optical flow feature to represent the frame, wherein the weighted pooling is related to a probability distribution of the optical flows, including weighting each higher-dimensional codes by an inverse proportional to a square root of a posterior of an optical flow corresponding to the higher-dimensional code.

7. The computer-readable medium or media of claim 6 wherein the method further comprises:
   normalizing the weighted pooled higher-dimensional codes to obtain the optical flow feature for the frame.

8. The computer-readable medium or media of claim 6 further comprising:
   extracting the set of frames from the video.

9. The computer-readable medium or media of claim 6 wherein the method further comprises:
   building the optical flow codebook using at least some of the optical flows.

10. The computer-readable medium or media of claim 6 wherein the method further comprises:
    using at least some of the optical flow features to train a model.

11. The computer-readable medium or media of claim 6 wherein the method further comprises:
    using at least some of the optical flow features from the frames to recognize one or more actions.

12. A non-transitory computer-readable medium or media comprising one or more sequences of instructions which, when executed by one or more processors, causes steps to be performed comprising:
    obtaining a set of local motion features for an image frame;
    for each local motion feature from the set of local motion features, generating a sparse coding vector; and
    forming an image feature that represents the image frame by pooling the sparse coding vectors based upon a weighting of a distribution of local motion features in the image frame, including:
       generating the image feature for a frame by pooling sparse coding vectors for the image frame by weighting each sparse coding vector in relation to a posterior of a local motion feature corresponding to the sparse coding vector, including weighting each sparse coding vector by an inverse proportional to a square root of a posterior of a local motion feature corresponding to the sparse coding vector.

13. The computer-readable medium or media of claim 12 wherein the step of forming an image feature that represents the image frame by pooling the sparse coding vectors based upon a weighting of the distribution of local motion features in the image frame further comprises:
    normalizing the pooled sparse coding vectors to form the image feature.

14. The computer-readable medium or media of claim 12 wherein the step of generating a sparse coding vector comprises:
    using Locality-constrained Linear Coding (LLC) and a codebook to generate the spares coding vector.

15. The computer-readable medium or media of claim 12 wherein the steps further comprise:
    using the image feature to recognize an action.

* * * * *